US008104809B1

(12) United States Patent
Mayhugh

(10) Patent No.: US 8,104,809 B1
(45) Date of Patent: Jan. 31, 2012

(54) SUCTION CUP WITH WARNING RING

(76) Inventor: Kent R. Mayhugh, Sussex, WI (US)

( * ) Notice: Subject to any disclaimer, the term of this patent is extended or adjusted under 35 U.S.C. 154(b) by 543 days.

(21) Appl. No.: 12/264,483

(22) Filed: Nov. 4, 2008

(51) Int. Cl.
*B25J 15/06* (2006.01)

(52) U.S. Cl. ..... 294/187; 294/185; 294/907; 248/205.8; 248/542

(58) Field of Classification Search ................. 294/64.1, 294/907, 185, 187; 248/205.8, 542, 206.2; 116/68, 70, DIG. 24
See application file for complete search history.

(56) References Cited

U.S. PATENT DOCUMENTS

| | | | | |
|---|---|---|---|---|
| 2,303,393 | A | 12/1942 | Schmidt | |
| 2,351,666 | A | 6/1944 | Cohen | |
| 2,420,811 | A | 5/1947 | Brewster et al. | |
| 2,871,054 | A | 1/1959 | Zinke | |
| 3,061,351 | A | 10/1962 | Johnson | |
| 3,180,604 | A | 4/1965 | Hammer | |
| 3,240,525 | A | 3/1966 | Wood | |
| 4,262,890 | A | 4/1981 | Sisko et al. | |
| 4,583,343 | A | 4/1986 | Camp | |
| 4,597,727 | A | 7/1986 | Birkhauser, III | |
| 5,184,858 | A | 2/1993 | Arai | |
| 5,395,159 | A | 3/1995 | Pinto | |
| 5,639,134 | A | 6/1997 | Rusch et al. | |
| 5,772,823 | A | 6/1998 | Rusch et al. | |
| 5,795,001 | A | 8/1998 | Burke | |
| 5,894,705 | A * | 4/1999 | Sutton | 52/747.1 |
| 5,909,758 | A | 6/1999 | Kitamura | |
| 6,039,371 | A | 3/2000 | Smith | |
| 6,328,363 | B1 | 12/2001 | Larsen | |
| 6,607,054 | B1 | 8/2003 | Lindfield | |
| 6,609,689 | B1 | 8/2003 | Knapp | |
| 6,913,232 | B2 | 7/2005 | Richter | |
| 7,004,521 | B2 | 2/2006 | Ishii | |
| 7,021,593 | B1 | 4/2006 | Fan | |
| 7,338,020 | B2 | 3/2008 | Magid | |
| 7,469,868 | B2 * | 12/2008 | Bury | 248/205.8 |
| 7,475,860 | B2 * | 1/2009 | Chien et al. | 248/363 |
| 7,665,706 | B2 * | 2/2010 | Chien et al. | 248/542 |
| 7,673,914 | B2 * | 3/2010 | Liao | 294/64.1 |
| 2004/0007888 | A1 | 1/2004 | Chen | |
| 2007/0210225 | A1 | 9/2007 | Carnevali | |

FOREIGN PATENT DOCUMENTS

| | | |
|---|---|---|
| GB | 954315 | 4/1964 |
| GB | 2215058 | 9/1989 |

* cited by examiner

*Primary Examiner* — Dean Kramer

(57) ABSTRACT

A manually activated suction lifting device has a handle which rotates up to complete an active suction. The first stage of the suction is created by pushing firmly down on the convex top of the device. Upon creation of the final suction with the handle locked up, an alarm button is drawn into the housing, hiding an alarm ring. If the suction fails, then a vent tube transmits the lost vacuum to an alarm chamber, thereby allowing a spring to bias the alarm button outbound, exposing the alarm ring to a worker so he can grab the workpiece and prevent damage.

5 Claims, 6 Drawing Sheets

SUCTION CUP WITH WARNING RING

FIELD OF INVENTION

The present invention relates to a manually activated suction pumps on a suction cup suited to lift windshields. A single throw handle activates the suction. When the suction pressure escapes, a red warning ring on a button pops out.

BACKGROUND OF THE INVENTION

Suction cups have long been used to grasp glass, tiles and windshields. A brief summary of the know art follows below.

U.S. Pat. No. 7,066,434 (2006) to Kwok discloses a suction cup with a rubber suction member covered by a plastic body. A neck extends up from the body. Inside the neck travels a stem which is attached to the rubber suction member. In the neutral position a spring in the neck biases the rubber suction member up (col. 2 line 61). To create a suction a button over the neck is depressed or a handle is pulled up. These actions push the rubber member away from the body. This is opposite to the Mayhugh invention. When the button is pushed down a red ring is covered by the neck. When the vacuum leaks, then the rubber member moves up, pushing up the button and exposing its red alarm ring. This invention does not provide a double action vacuum action with its handle. Also, the ring is physically depressed, depressed via a vacuum as in the Mayhugh invention.

U.S. Pat. No. 3,240,525 (1966) to Wood discloses a hand/finger pump on a suction cup. A red ring is located on the pump plunger. As the vacuum under the rubber member increases, the red ring disappears into the pump housing. When the vacuum leaks a spring pushes the plunger out creating a warning with the red ring exposed. No double action vacuum mechanism is shown, only the pump.

U.S. Pat. No. 7,004,521 (2006) to Ishii discloses a suction cup that has a locking handle to raise the rubber member via a rod imbedded in the rubber member. This theory is the same as Mayhugh's. No warning device is shown.

U.S. Pat. No. 5,795,001 (1998) to Burke discloses a suction cup which is activated by a battery operated vacuum pump with electronic alarm for vacuum loss.

U.S. Pat. No. 5,184,858 (1993) to Arai discloses a finger pump with an indicator red ring on the plunger. A battery operated sound alarm is also provided.

U.S. Pat. No. 7,293,750 (2007) to Richter discloses a lever operated suction member with a heat separating element.

U.S. Pat. No. 7,338,020 (2008) discloses a suction member that is pulled from the work surface like the Mayhugh invention. No indicator is shown.

U.S. Pat. No. 5,639,134 (1997) to Rusch et al. discloses the Auto Glass Specialists which has a finger pump. No indicator is shown.

U.S. Pat. No. 5,772,823 (1998) to Rusch et al. (Auto Glass Specialists) discloses a method to install a windshield using a suction cup with a sealant.

U.S. Pat. No. 6,039,371 (2000) to Smith discloses a flooring installation suction device.

U.S. Pat. No. 2,303,393 (1940) to Schmidt discloses a basic lever operated rubber member that is pushed against the glass for creation of a vacuum.

U.S. Pat. No. 2,370,938 (1945) to Cohen discloses a basic glass lifter suction cup which raises the rubber member like Mayhugh's invention. No indicator is shown.

U.S. Pat. No. 2,420,811 (1947) to Brewster et al. discloses a glass lifter suction cup which raises the rubber member like Mayhugh's invention. No indicator is shown.

U.S. Pat. No. 2,871,054 (1956) to Zinke discloses the same raise the rubber suction cup with no indicator like Brewster.

GB 2215058 discloses a low pressure indicator with a sliding rod moved by a pressure sensing diaphragm.

GB 954315 discloses a pump type suction cup with a leveraged handle for pumping.

U.S. Pat. No. 6,607,054 (2003) to Lindfield discloses a powered vacuum pump used to activate a suction cup.

U.S. Pat. No. 3,180,604 (1965) to Hammer discloses a pair of joined suction cups with a handle between them that can activate the cups.

U.S. Pat. No. 4,262,890 (1981) to Sisko et al. discloses an upside down suction cup for a ski holder.

U.S. Pat. No. 4,397,491 (1983) to Anderson discloses a hand pump suction cup.

U.S. Pat. No. 4,583,343 (1986) to Camp discloses a simple suction cup based tile setter. It is pump activated.

U.S. Pat. No. 4,597,727 (1986) to Birkhauser, III discloses a hand pump activated suction cup.

U.S. Pat. No. 5,395,159 (1995) to Pinto discloses a suction cup holding a headrest.

U.S. Pat. No. 5,909,758 (1999) to Kitamura discloses a hand rest on suction cups of the raise the diaphragm type.

U.S. Pat. No. 6,328,863 (2001) to Larsen discloses a suction cup for light weight CD's.

U.S. Pat. No. 6,609,689 (2003) to Knapp discloses a wall mount suction cup.

U.S. Pat. No. 6,913,232 (2005) to Richter discloses a raise diaphragm wall mount suction disc.

U.S. Pat. No. 7,021,593 (2006) to Fan discloses a suction disc rack.

Pub. No. US 2004/007888 discloses a raise diaphragm suction cup with a handle and release tab.

Pub. No. US 2007.0210225 discloses having an axial (twisting) suction cup.

What is needed in the art is a powerful suction cup for lifting windshields as is shown by Rusch et al '134. Additionally, the warning ring concept taught by Kwok '434 is needed. Finally, a quick to use handle is needed as a vacuum applicator to obtain the adherence to glass taught by Cohn '938, but achieve the great tenacity quickly without having to twist a knob.

The present invention meets all the needs, thus increasing the efficiency of a professional windshield installer.

SUMMARY OF THE INVENTION

The main aspect of the present invention is to provide a large handle on a suction cup, said handle used to achieve a powerful suction quickly by lifting the center of the rubber cup away from the workpiece.

Another aspect of the present invention is to provide a vacuum sensor port in the suction cup surface which activates a sliding alarm button upon loss of vacuums.

Another aspect of the present invention is to automatically set the sliding alarm button to the non-alarm position while creating the vacuum under the suction cup.

Another aspect of the present invention is to provide a lock up lever for the handle to allow the handle to be used for lifting a heavy object such as a windshield.

Another aspect of the present invention is to provide a convex body for the suction cup to allow a worker to firmly press down on the suction cup to start the creation of a vacuum. The worker completes the vacuum by raising the handle.

Other aspects of this invention will appear from the following description and appended claims, reference being made to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
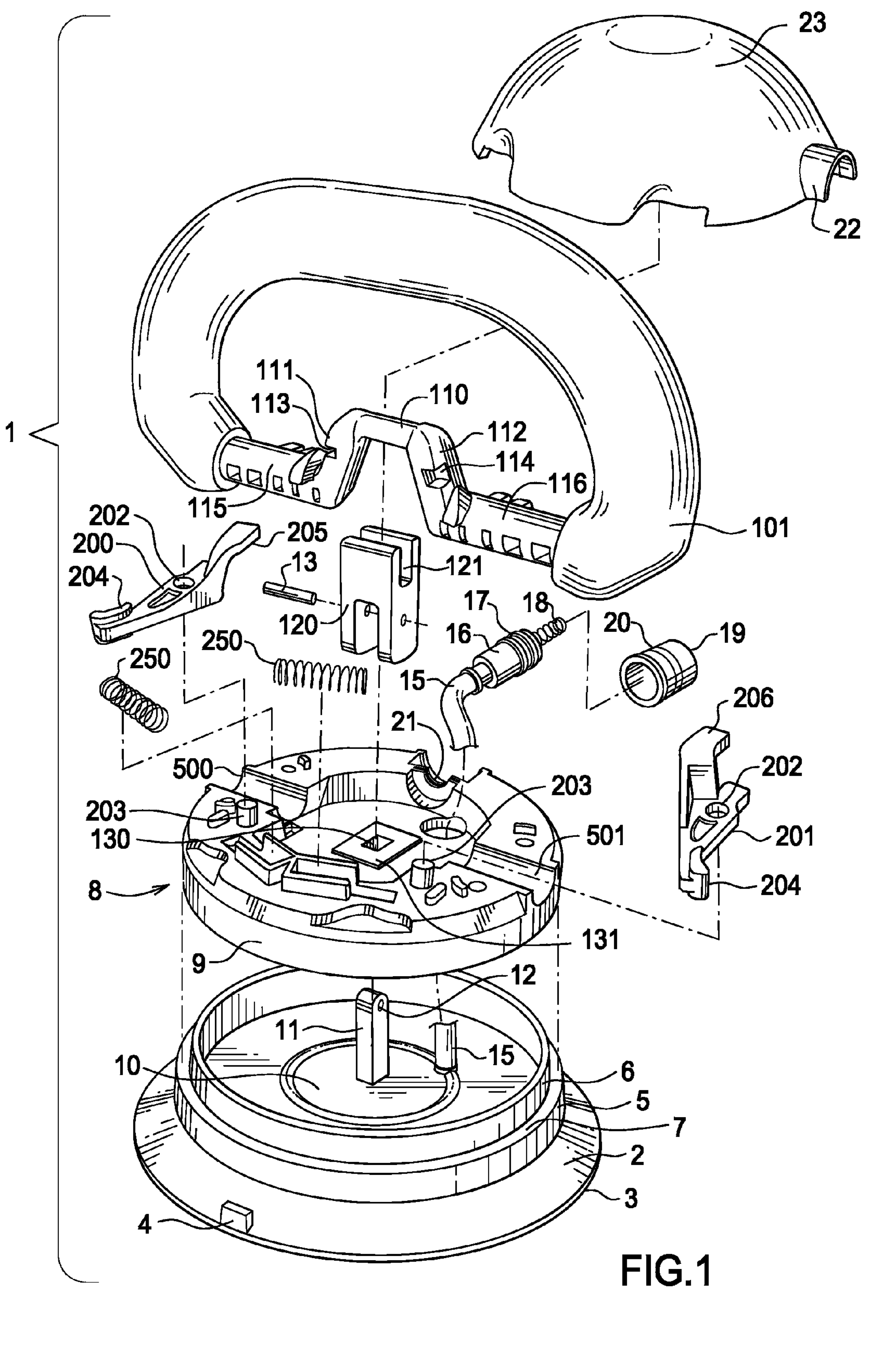
FIG. 1 is an exploded view of the preferred embodiment.
Figure 10:
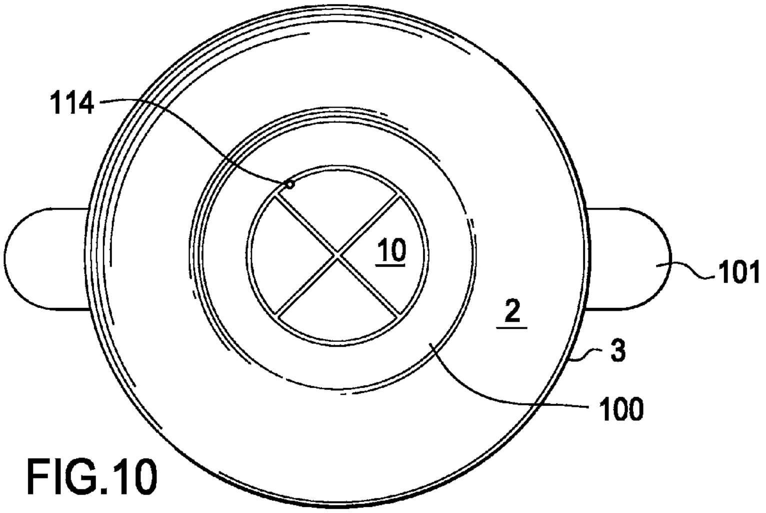
FIG. 10 is a bottom plan view.

Referring first to FIG. 1 a suction lifting device 1 has a resilient suction cup 2 preferably made of rubber. The suction cup 2 has a round outer periphery 3 and grip tabs 4. A first support wall 5 forms a support at edge 7 for the (plastic) base 8. A second support wall 6 also supports base 8 by nesting inside peripheral wall 9 of base 8. A piston 10 is imbedded into suction cup 2. The piston rod 11 has a mounting hole 12 to receive pin 13. Referring next to FIG. 10 the central portion 100 of suction cup 2 can be raised/lowered by piston 10. A vent hole 114 communicates via tube 15 to the alarm chamber 16 (shown in FIGS. 1 and 7). The alarm chamber 16 is supported in the base 2 at recess 21 and sandwiched into recess 21 by crown 22 of top 23. The top 23 is convex to fit the shape of a palm of a human hand. After a vacuum is formed under suction cup 2, the vacuum is communicated to alarm chamber 16, wherein the spring 18 is overpowered. The alarm button 19 is drawn inbound by the vacuum under suction cup 2 via tube 15 and alarm chamber 16. Gaskets 17 keep an airtight/sliding seal between the alarm button 19 and the alarm chamber 16. A bright (red) color alarm ring 20 becomes visible when the vacuum under suction cup 2 weakens, thus causing the spring 18 to push the alarm button 19 outbound. This entire operation of drawing the alarm button 19 inbound during vacuum creation and then causing the alarm ring 20 to appear during a failure of the vacuum is all hands free and automatic.

Figure 3:
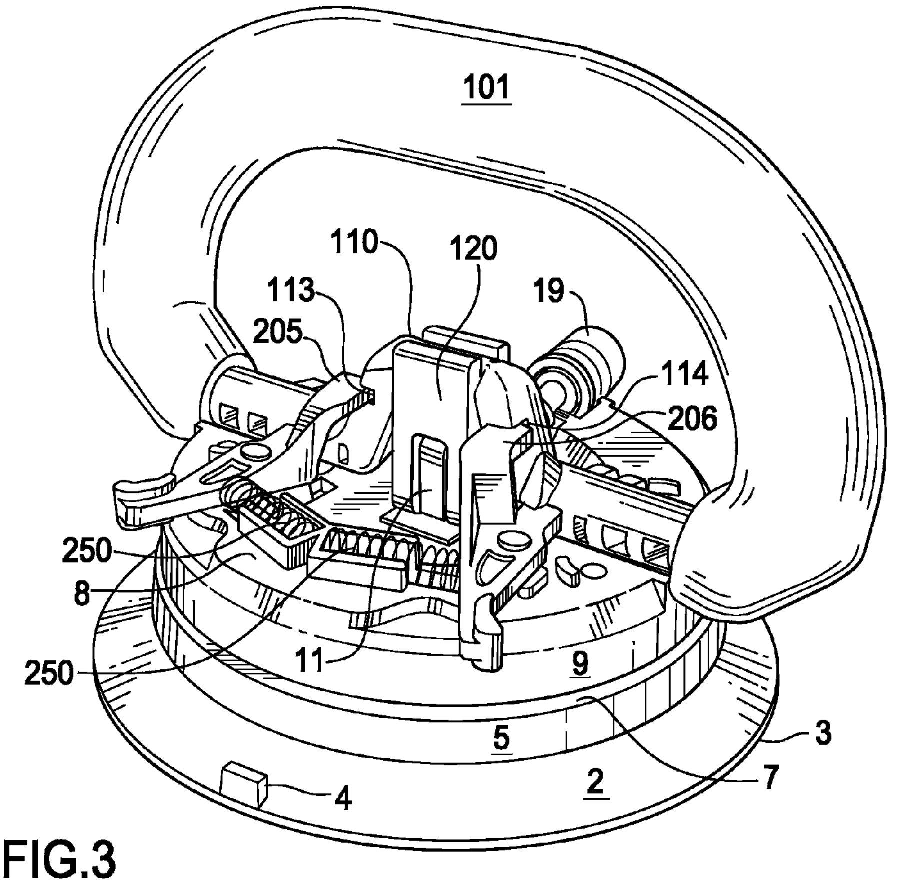
FIG. 3 is the same view as FIG. 2, handle up in the active mode.

The formation of the vacuum under suction cup 2 requires two steps. First the user pushes against top 23 which creates a partial vacuum under suction cup against the workpiece 50, see FIG. 5. Next the user raises handle 101 as shown in FIG. 6. By raising handle 101 the arch top 110 is raised to the position shown in FIGS. 1 and 3. This completes the creation of the vacuum under suction cup 2. The arch top 110 is held by the groove 121 of cam 120. The pin 13 locks the piston rod 11 to the cam 120. Thus as the handle 101 is raised, the piston rod 11 and piston 10 are raised as the piston rod 11 raises thru hole 130, and the cam 120 is pressed against collar 131 of base 8. Raising the piston 10 increases the volume of air under suction cup 2. This increases the vacuum. The arch top 110 is supported by legs 111, 112; each of which has a locking groove 113, 114. The legs 111, 112 are supported by base elements 115, 116 of handle 101 which rotate in grooves 500, 501. In order to release the vacuum two handles 200, 201 are provided. Each handle 200, 201 has a pivot hole 202 which pivots around stud 203. When finger rests 204 are squeezed, the handle locks 205, 206 rotate outbound, thereby releasing from locking grooves 113, 114. It should be noted that springs 250 bias handle locks 205, 206 into locking grooves 113, 114 automatically when the handle 101 is raised as shown in FIGS. 1,3. When locked up the handle 101 cannot be moved down until the finger rests 204 are squeezed.

Figure 2:
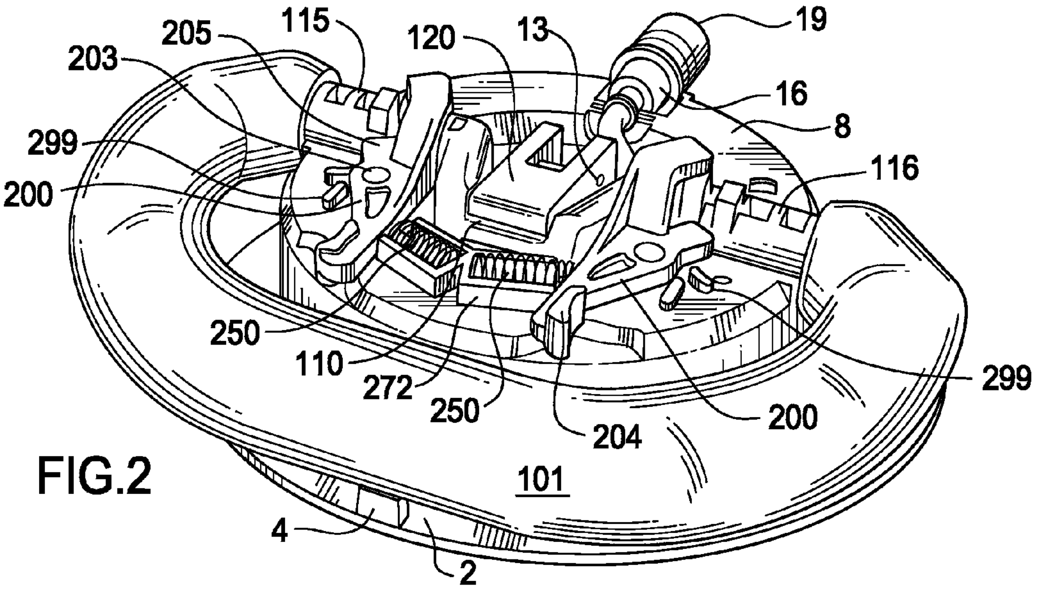
FIG. 2 is a perspective view with the cover off, handle down in passive mode.

Referring now to FIG. 2 the top 23 is removed from the suction lifting device 1. The handle 101 is down. The tab 4 could be used to lift the suction cup 2 away from a workpiece. Note how the spring 250 biases the handle 200 above the pivot 203, thus biasing the lock 205 inward. The stops 299 control the rotation of the handle(s) 200. The anchors 272 secure the springs 250.

Referring next to FIG. 3 the top 23 is removed. Locks 205, 206 are engaged in locking grooves 113, 114. The suction lifting device 1 is in the active mode.

Figure 4:
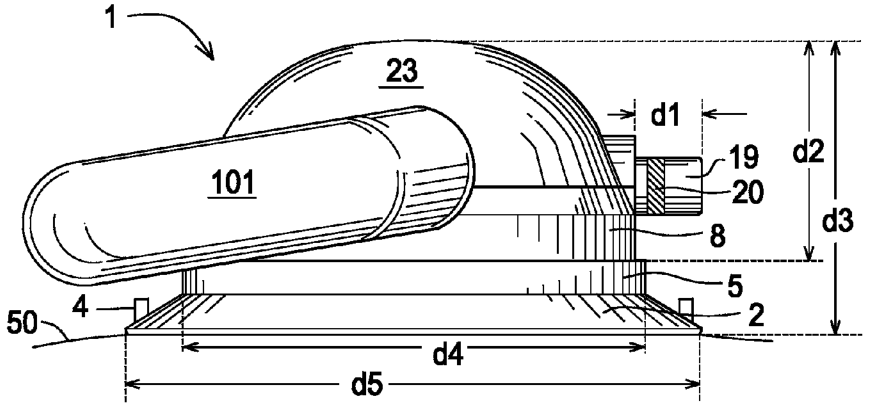
FIG. 4 is a side elevation view, handle down.

Referring next to FIGS. 4, 6 nominal dimensions in inches are d1=0.784, d2=2.100, d3=2.875, d4=5.000, d5=6.500, d6=4.690, d7=0.405, d8=5.000, d9=5.500.

The suction lifting device 1 is in the passive mode in FIG. 4 with the alarm button 19 spring biased outbound, the alarm ring 20 visible.

Figure 5:
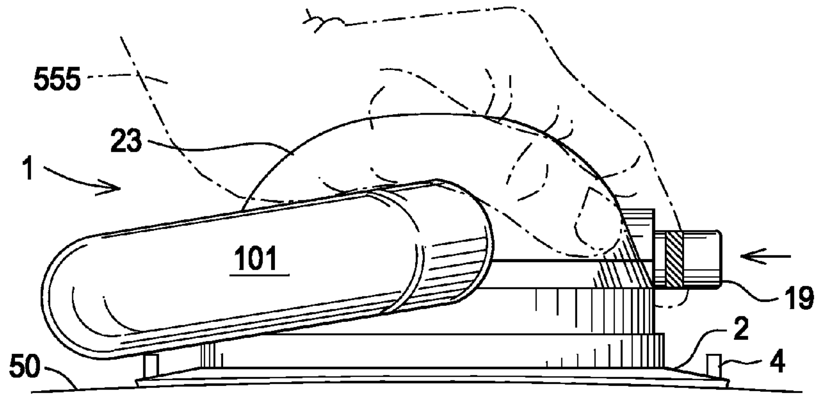
FIG. 5 is the same view as FIG. 4 with a hand pressing down on the about half sphere convex housing.
Figure 6:
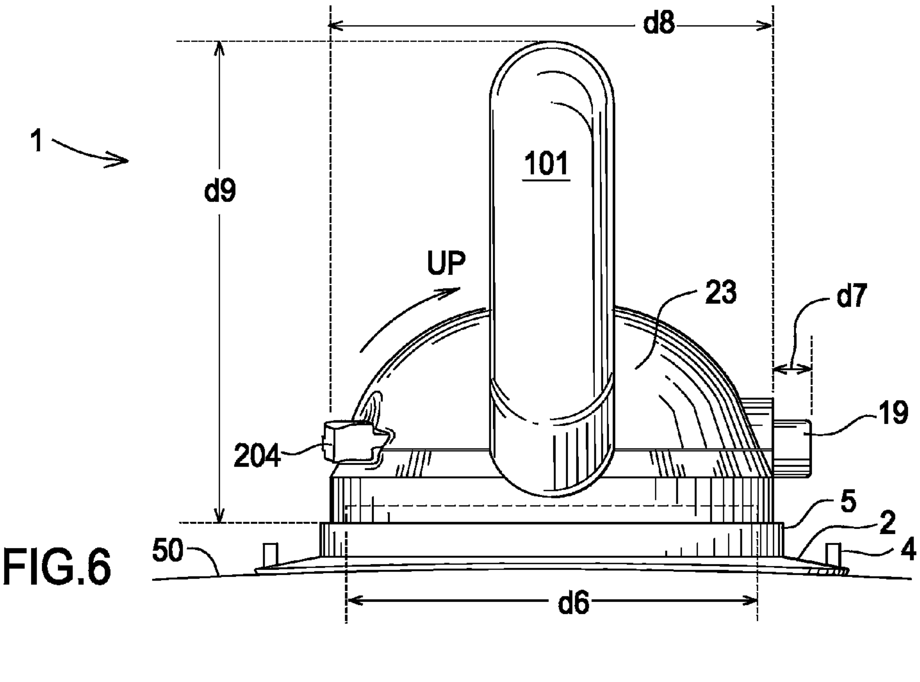
FIG. 6 is the same view as FIG. 4 with the handle up.

Referring next to FIG. 5 the user's hand 555 is pressing the suction lifting device 1 against the workpiece 50. The top 23 fits snugly in the palm of the hand 555. This is the first step toward accomplishing the active mode. A partial vacuum has been created under suction cup 2.

Referring next to FIG. 6 the handle 101 has been pulled up to the active modes as shown, by arrow UP completing the vacuum under suction cup 2. The alarm button 19 has been drawn inbound by the vacuum, hiding the alarm ring 20.

Figure 7:
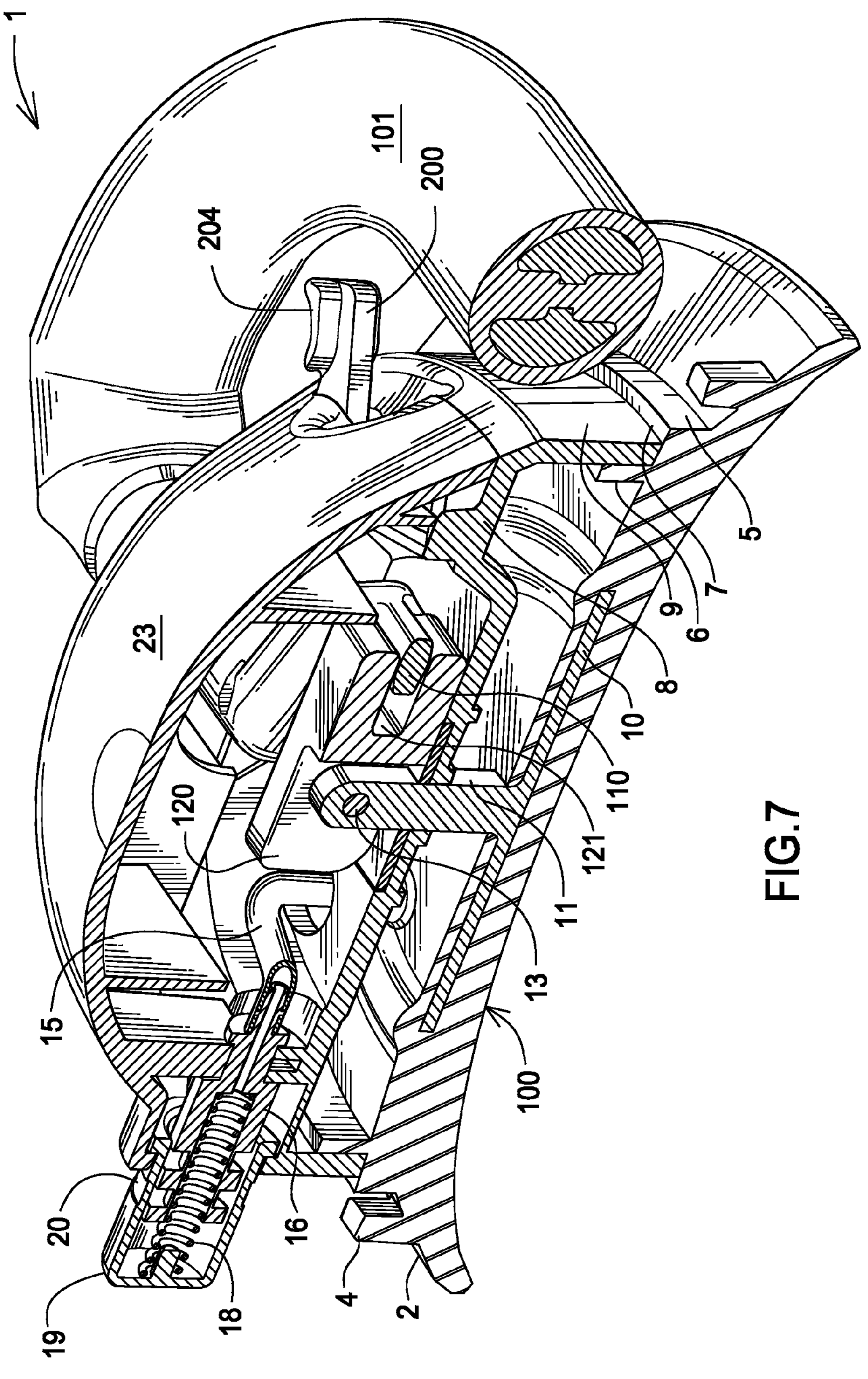
FIG. 7 is a cross sectional view with the handle down.

Referring next to FIG. 7 the handle 101 is in the passive mode. The center 100 of suction cup 2 has not been pulled up. The spring 18 biases the alarm button 19 outbound.

Figure 8:
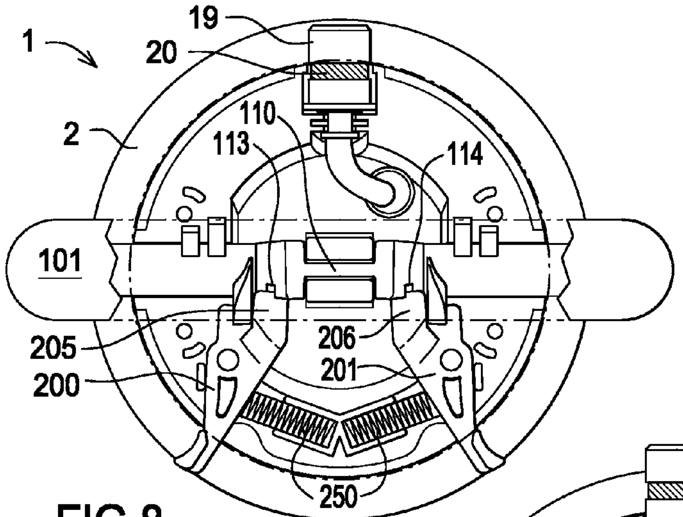
FIG. 8 is a top plan view with the cover in phantom, with the handle up.

Referring next to FIG. 8 the top 23 is removed. The handle 101 is in the up and active mode. The alarm button 19 has been drawn inbound hiding alarm ring 20 from view.

Figure 9:
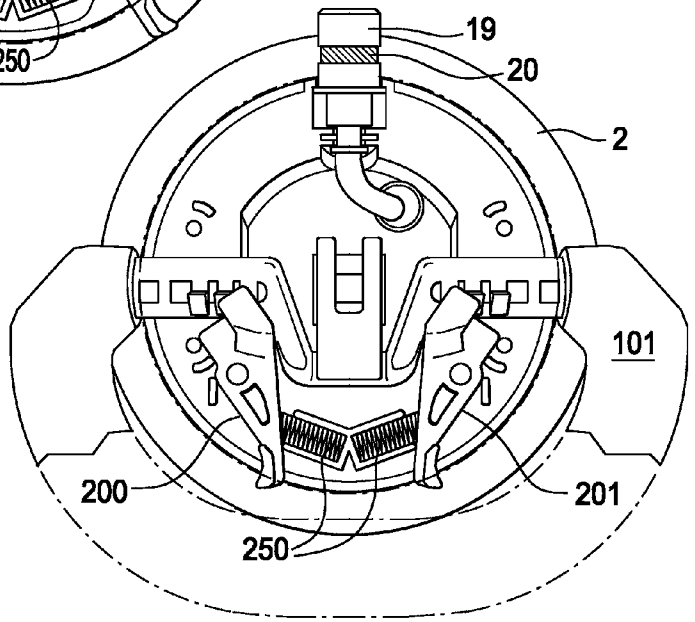
FIG. 9 is a top plan view with the cover in phantom, with the handle down.

FIG. 9 shows the same view as FIG. 8 with the handle 101 down in the passive mode. The alarm button 19 has been spring biased outbound exposing alarm ring 20.

Figure 11:
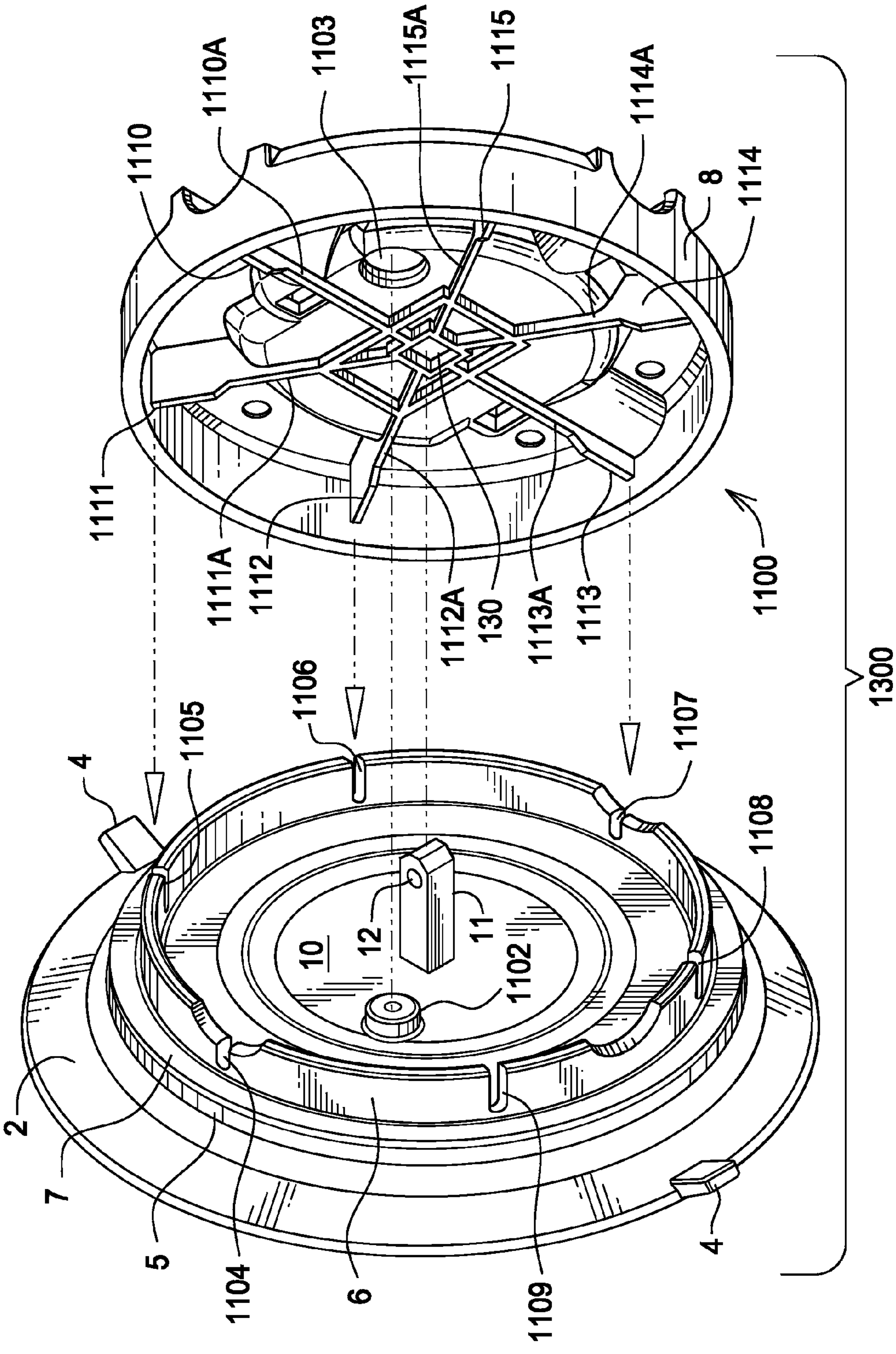
FIG. 11 is an exploded view showing the top of the suction cup 2 and the bottom of the base 8.

FIG. 11 shows the bottom 1100 of base 8 and the top of suction cup 2. Alignment hole 1103 snaps over plug 1102 when the base 8 is fitted to the suction cup 2. Grooves 1104, 1105, 1106, 1107, 1108, 1109 receive guides 1110, 1111, 1112, 1113, 1114, 1115. The assembly 2, 8 is designated as 1300. Element 2 is all rubber and element 8 is all plastic. Piston 11 is metal. In FIG. 10, the piston 10 may be covered by a layer of rubber from the suction cup 2.

Each guide 1110-1115 is supported by its respective radial arm 1110A, 1111A, 1112A, 1113A, 1114A, 1115A. In operation when as shown in FIG. 5 a hand presses down on top 23, this force downward is projected to grooves 1104-1109 on rubber wall 6 which aids in the flattening of suction cup 2 against a workpiece Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A suction device comprising:
- a base forming about a half sphere having a convex top adapted to fit the shape of a palm of a human hand so that the suction device can be pressed against a workpiece by the palm of a human hand,
- a suction cup connected to said base, the suction cup including a piston therein,
- a piston rod in said base and connected to the piston,
- a cam adjacent the base and pivotally connected at one end to said piston rod, so that when said cam is rotated in one direction, said piston rod moves said piston and increases the vacuum in said suction cup, and when said cam is rotated in the opposite direction, said piston rod moves said piston and decreases the vacuum in said suction cup,
- a C shaped handle having two ends and two base elements, each connected to a handle end and extending between said handle ends and rotatably mounted in the base, and arch top connected between the base elements and pivotally connected to said cam so that when said handle is rotated, it rotates said cam,
- an alarm chamber in said base, said alarm chamber communicating with said suction cup,
- an alarm button movable in said alarm chamber, and
- a spring located between said base and said alarm button and biasing said alarm button away from said base and out of said alarm chamber,
- said alarm button including an alarm ring, so that when said alarm button is biased away from said base by said spring, said alarm ring is visible, and so that when a sufficient vacuum is present in said suction cup, said alarm ring is not visible.

2. A suction device according to claim 1 wherein said cam has a groove therein that receives the arch top of said handle, so that said handle is pivotally connected to said cam.

3. A suction device according to claim 2 wherein said suction device further includes handle locks pivotally mounted in said base, that engage said handle when said handle is in its increased vacuum position.

4. A suction device according to claim 1 wherein said suction device further includes handle locks pivotally mounted in said base, that engage said handle when said handle is in its increased vacuum position.

5. A suction device comprising:
- a base forming about a half sphere having a convex top adapted to fit the shape of a palm of a human hand so that the suction device can be pressed against a workpiece by the palm of a human hand,
- a suction cup connected to said base,
- the suction cup including a piston therein,
- a piston rod in said housing and connected to the piston,
- a cam adjacent the base and pivotally connected at one end to said piston rod, so that when said cam is rotated in one direction, said piston rod moves said piston and increases the vacuum in said suction cup, and when said cam is rotated in the opposite direction, said piston rod moves said piston and decreases the vacuum in said suction cup, and
- a C shaped handle having two ends and two base elements, each connected to a handle end and extending between said handle ends and rotatably mounted in the base, and an arch top connected between the base elements and pivotally connected to said cam so that when said handle is rotated, it rotates said cam.

* * * * *